Dec. 10, 1946. S. W. GLANZ ET AL 2,412,330
SNAP-ON VALVE
Filed June 23, 1944

INVENTORS
Sjunne W. Glanz &
Arthur H. Tidd
BY
Bair & Freeman
Atty's

Patented Dec. 10, 1946

2,412,330

UNITED STATES PATENT OFFICE 2,412,330

SNAP-ON VALVE

Sjunne W. Glanz and Arthur H. Tidd, Cleveland, Ohio, assignors to The Aro Equipment Corporation, Bryan, Ohio, a corporation of Ohio Application June 23, 1944, Serial No. 541,793

5 Claims. (Cl. 251—46)

Our present invention relates to a connection between a valve stem and a valve disc and is particularly adapted for "snap-on" connection between the two in connection with a demand valve of a Demand oxygen regulator.

One object of the invention is to provide a very simple snap-on connection involving a minimum of parts for its fabrication and capable of connection and disconnection without the use of any tools.

Another object is to provide a connection which is of the "push-pull" type as distinguished from a contact type for an important purpose that will hereinafter appear.

More particularly it is our object to provide connecting means between a valve disc and a valve stem in the form of a spring wire clip, the arms of which are mounted in a pair of chordal openings of the valve disc and cooperate with an annular groove of the valve stem.

With these and other objects in view, our invention consists in the construction, arrangement and combination of the various parts of our snap-on valve, whereby the objects contemplated are attained, as hereinafter more fully set forth, pointed out in our claims and illustrated in the accompanying drawing, wherein:

Figure 1:
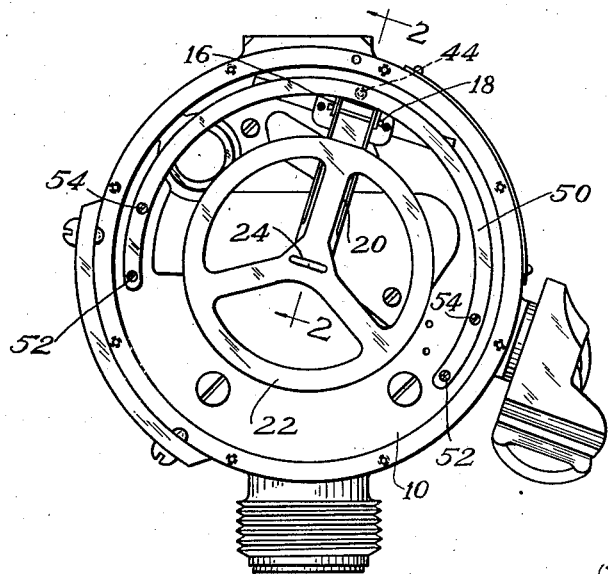
Figure 1 is a front elevation of a demand type oxygen regulator to which our valve is applied, the cover of the regulator being removed.
Figure 2:
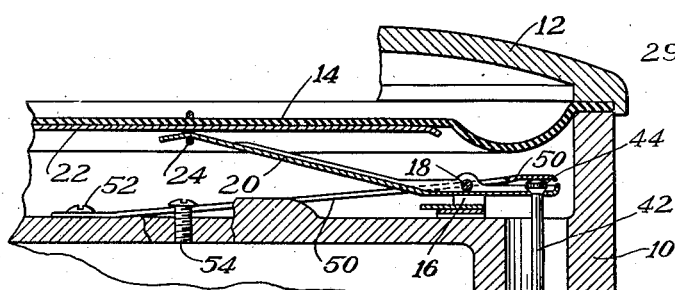
Figure 2 is an enlarged sectional view on the line 2—2 of Figure 1.
Figure 6:
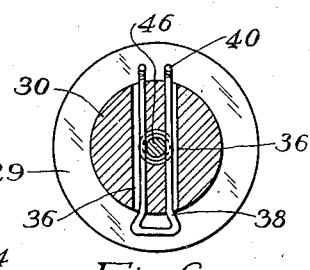
Figure 6 is a sectional view on the line 6—6 of Figure 5.

On the accompanying drawing, we have used the reference numeral 10 to indicate in general the housing of a demand type oxygen regulator. The housing 10 has a cover 12 open so that atmosphere can impinge a diaphragm 14 formed of thin rubber or the like and responsive to internal pressure changes in the housing 10 as varied by the breathing of the user in the usual manner.

Within the housing 10 a bracket 16 supports a pivot pin 18 on which is pivoted an actuating arm 20. The arm 20 is secured to a spider 22 by means of a wire clip 24 and is for the purpose of automatically operating the valve as will hereinafter appear.

A valve seat member 26 is screwed into the housing 10 and includes a valve seat 28. For seating on the seat 28 a valve disc 29 is provided, having a hub 30. The disc 29 has secured thereto by cement or vulcanization a disc 32 of neoprene or the like, to effect a good seal against the valve seat 28. The hub 30 has therein a socket 34 and a pair of chordal openings 36. The openings 36 receive a U-shaped spring wire clip 38 which is retained in position by upturning the ends as at 40.

The clip 38 is adapted to coact with a valve stem 42 having a head 44. The valve stem 42 has an annular groove 46 adjacent its lower end, which divides the stem into an upper portion and a head at its lower end designated 48.

The head 44 of the stem 42 is engaged with the short end of the lever 20 by a leaf spring 50. The spring 50 is anchored to the housing 10 by screws 52 and its tension may be adjusted by screws 54.

Practical operation

In the operation of the valve structure under normal operating conditions, an inhalation by the user of the oxygen regulator results in atmospheric pressure depressing the diaphragm 14 thereby causing the lever 20 to pull upwardly on the head 44 and the stem 42 to positively open the valve 29. This positive action overcomes any sticking or freezing of the valve to the valve seat, which is a fault encountered under extreme cold or heat conditions where the oxygen pressure through the valve seat member is relied upon to open the valve and the stem is engaged with the valve disc merely by contact. Upon exhalation, the diaphragm 14 will be raised for permitting the spring 50 to close the valve.

The snap-on connection provided by the spring clip 38 permits of a push-pull connection between the valve stem and the valve disc, yet provides one which is readily connectible and disconnectible.

Figure 3:
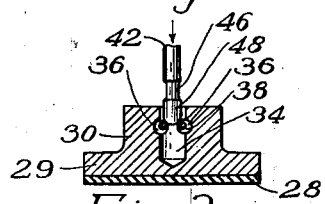
Figure 3 is a further enlarged sectional view of the valve and valve stem connection showing the parts being put together.
Figures 4, 5:
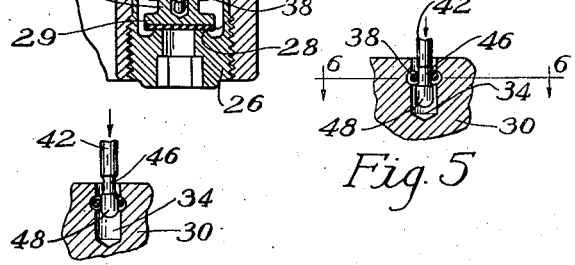
Figure 4 is a similar view showing an intermediate position between Figure 3 and fully inserted position.
Figure 5 is a similar sectional view showing the fully inserted position.

In Figure 3 the stem is being connected to the valve by pressing downwardly on the stem, which results in the head 48 engaging the arms of the clip 38. The head spreads the arms apart as in Figure 4 as the stem is pushed further downward, and finally the arms snap into the annular groove 46 as in Figure 5. The valve disc is now retained by the wire clip against disconnection, except upon excess pressure being applied, as when it is desirable to disassemble the valve disc from the stem.

The socket 34 is enlarged with relation to the head 48 so that there is a floating connection which permits ready conformation of the valve disc to its seat. The chordal openings 36 are large enough to permit springing apart of the arms of the clip as in Figure 4 during the assembling and disassembling operations.

The structure is comparatively simple yet effective in operation and eliminates the necessity of any special tools for assembly and disassembly.

Some changes may be made in the construction and arrangement of the parts of our device without departing from the real spirit and purpose of our invention, and it is our intention to cover by our claims any modified forms of structure or use of mechanical equivalents which may be reasonably included within their scope without sacrificing any of the advantages thereof.

We claim as our invention:

1. In a valve structure, a valve disc adapted to seat on a valve seat, a valve stem for actuating said valve disc, and an operative push-pull connection between said valve stem and said valve disc comprising a hub on the valve disc, a socket therein to receive one end of said valve stem, said valve stem having a peripheral groove adjacent said end, a pair of chordal openings through said hub and passing through said socket, and a U-shaped holding clip of spring wire in said chordal openings and in said peripheral groove, the arms of said holding clip being smaller in diameter than said chordal openings and said chordal openings being so spaced as to permit seating of said arms in said groove under their bias toward each other.

2. A valve structure comprising a valve disc, a valve stem for actuating said valve disc and an operative connection between said valve stem and said valve disc comprising a socket in said disc to receive one end of said valve stem, said valve stem having a peripheral groove adjacent said end, a pair of chordal openings through said disc and passing through said socket, and a spring wire holding clip having its arms in said chordal openings and seated in said peripheral groove, said chordal openings being enlarged in a direction away from each other with respect to said arms when they are so seated in said groove.

3. A valve structure comprising a valve disc adapted to be seated on a valve seat, a valve stem therefor, and an operative connection between said valve stem and said valve disc comprising a socket in the disc to receive one end of the stem, said stem having a peripheral groove adjacent said end, a pair of chordal openings through said disc and passing through said socket, and a U-shaped clip having arms engaging adjacent sides of said pair of chordal openings and capable of springing toward the other sides thereof when the head of said stem is inserted into said socket, said chordal openings being larger than said arms to permit their being spread apart by said stem and their snapping into said groove when it registers therewith, and said socket being larger than the diameter of said stem to permit of a floating connection between the valve stem and the valve disc.

4. A valve structure comprising a valve disc adapted to be seated on a valve seat, a valve stem therefor, and an operative connection between said valve stem and said valve disc comprising a socket in the disc to receive one end of the stem, said stem having a peripheral groove adjacent said end, a pair of chordal openings through said disc and passing through said socket, and a U-shaped clip having arms engaging adjacent sides of said pair of chordal openings and capable of springing apart and toward the other sides of said chordal openings when the head of said stem is inserted into said socket, said chordal openings being enough larger than said arms to permit of such springing apart and said arms snapping into said groove when it registers with the arms, the end of said stem being tapered to engage between said arms and spread them.

5. In a valve structure for oxygen regulators, a valve disc, a valve stem therefor, and an operative connection between said valve stem and said valve disc comprising a socket in the disc to receive one end of the valve stem, said valve stem having a groove adjacent said end, a pair of chordal openings through said disc and passing through opposite sides of said socket, and a clip having spring arms smaller than and engaging adjacent sides of said pair of chordal openings, and entering the groove of said stem, said arms snapping into said groove when it registers therewith, and snapping out of said groove upon disassembly pulling pressure being applied to said stem, the end of said stem and the side walls of said groove being so shaped and proportioned as to enable them to separate said arms to effect such snapping out of and into said groove.

SJUNNE W. GLANZ.
ARTHUR H. TIDD.